United States Patent [19]
Folkers

[11] Patent Number: 5,683,116
[45] Date of Patent: Nov. 4, 1997

[54] O-RING PUSH-PULL PIPE JOINT

[75] Inventor: Joie L. Folkers, Wichita Falls, Tex.

[73] Assignee: Ameron International Corporation, Pasadena, Calif.

[21] Appl. No.: 547,572

[22] Filed: Oct. 24, 1995

[51] Int. Cl.$^6$ .................................. F16L 35/00
[52] U.S. Cl. .............. 285/18; 285/328; 285/344; 285/369; 29/451; 29/890.14
[58] Field of Search .................. 285/344, 369, 285/339, 18, 328; 29/451, 890.14

[56] References Cited

U.S. PATENT DOCUMENTS

| | | | |
|---|---|---|---|
| 2,285,046 | 6/1942 | Murdock | 285/115 |
| 2,383,692 | 8/1945 | Smith | 285/123 |
| 2,738,992 | 3/1956 | Heisler | 285/59 |
| 2,816,782 | 12/1957 | Anderson | 285/345 |
| 2,931,671 | 4/1960 | Beeley | 285/95 |
| 3,250,538 | 5/1966 | Albon | 277/24 |
| 3,589,750 | 6/1971 | Dunmire | 285/95 |
| 3,917,325 | 11/1975 | Mengeringhausen | 285/344 |
| 5,222,773 | 6/1993 | Boehme | 285/344 |

FOREIGN PATENT DOCUMENTS

| | | | |
|---|---|---|---|
| 29877 | 9/1907 | Austria | 285/344 |
| 120716 | 1/1931 | Austria | 285/344 |
| 210687 | 8/1960 | Austria | 285/344 |
| 210688 | 8/1960 | Austria | 285/344 |
| 90507 | 2/1961 | Denmark . | |
| 821365 | 12/1937 | France . | |
| 858164 | 12/1952 | Germany | 285/344 |
| 899580 | 11/1953 | Germany . | |
| 1919549 | 11/1970 | Germany . | |
| 2545460 | 4/1977 | Germany . | |
| 512428 | 9/1956 | Italy | 285/344 |
| 310455 | 6/1929 | United Kingdom | 285/344 |
| 531091 | 12/1940 | United Kingdom . | |
| 1000638 | 8/1965 | United Kingdom | 285/344 |

*Primary Examiner*—Dave W. Arola
*Attorney, Agent, or Firm*—Christie, Parker & Hale, LLP

[57] ABSTRACT

A coupling device is used for joining two pipes. Each end of the coupling has a pair of adjoining grooves in its inner surface. Each groove has at its largest diameter a substantially flat portion located at its innermost end and then tapers in the direction of the coupling end. At the junction between the two grooves, the diameter of outermost groove is greater than the diameter of the innermost groove, forming a small circumferential ridge. An O-ring is initially set in the innermost groove and is compressed as the pipe is pushed into the coupling. The O-ring is further compressed as it rolls down the ramp of the inner groove as the pipe is partially retracted from the coupling. As the O-ring is pulled past the circumferential ridge between the grooves, it expands into the flat portion of the outer groove, forming a seal between the pipe and the coupling and a positive indication of sealing. The flat portion of the outer groove permits the entire O-ring to roll over the ridge before compression of the O-ring by the tapered portion of the outer groove. After installation, forces tending to push the pipe out of the coupling cause the O-ring to roll against the steep incline of the tapered surface of the outer groove, resulting in further compression of the O-ring, thereby tightening the seal.

25 Claims, 1 Drawing Sheet

O-RING PUSH-PULL PIPE JOINT

FIELD OF THE INVENTION

This invention relates to an economical simplified coupling for pipe joints.

BACKGROUND OF THE INVENTION

This invention pertains to a joining means to hold cylindrical shapes and is particularly useful in forming a sealed connection between two square cut pipe sections, i.e., pipe sections having a right cylindrical end portion and a constant external diameter extending into an associated "half" of a coupling.

Previously, a common practice has been to specially prepare the pipe ends with a tapered exterior for insertion into a flanged coupling of a type formed with an interior groove encircling its inner surface. A resilient seal ring is then inserted into the groove. The tapered pipe end is thrust into the associated "half" of the coupling. Accordingly, the pipe ends must be machined in advance as a separate step in preparing the coupling. These "push-type" couplings require a considerable amount of assembly force to install a sufficiently tight seal. Also, these joints are not easily disassembled and reassembled in the field.

In operation, fluid pressure from within the pipe section acts against the seal ring by tending to push the pipe out of the coupling. The above type of coupling has been subject to loss of its seal under fluid pressure wherein the seals have been blown out of the coupling under line pressure.

SUMMARY OF THE INVENTION

A push-pull pipe joint is provided for joining pipes which does not require special shaping or grooving tools, provides a reliable seal, and is easily disassembled and re-assembled as needed.

The push-pull pipe joint comprises an outer pipe coupling member having an open end and an internal pipe to be joined and sealed by an O-ring. The coupling member comprises a pair of tapered internal grooves near its open end. Each pair comprises an inner groove further from the open end abutting an outer groove closer to the open end. The diameter of the outer groove is larger than the diameter of the inner groove at their junction, forming a circumferential ridge between the grooves. The outer groove has a portion tapering toward a smaller diameter nearer the open end and a flat portion between the tapered portion and the ridge. The outside diameter of the pipe is slightly smaller than the inside diameter of the coupling member open end, whereby the pipe fits into the end of the coupling member trapping the O-ring gasket in the outer groove. Preferably, the outer groove has a conically tapered portion which compresses the O-ring gasket and forms a joint between the pipe and coupling member.

To assemble the joint, an O-ring gasket with an inner diameter smaller than the outer diameter of the pipe section to be installed is fit into the flat portion of the innermost groove. The pipe section is slid into the coupling, compressing the O-ring gasket as it passes. The pipe is then retracted part way within the coupling, rolling the O-ring down the inclined surface of the innermost groove and causing it to further compress. As the O-ring is pulled past the circumferential ridge at the junction between the grooves, it expands into the flat portion of the outer groove, forming a seal between the pipe and the coupling.

After installation, forces tending to push or pull the pipe out of the coupling cause the O-ring to roll against the incline of the tapered surface of the outer groove, resulting in further compression of the O-ring, thereby tightening the seal.

DETAILED DESCRIPTION

For illustration purposes, the description focuses solely on a joint made between a square cut pipe section and a square cut coupling. Also, only one coupling half and associated joint assembly, are described since both coupling halves are of identical construction.

Figure 1:
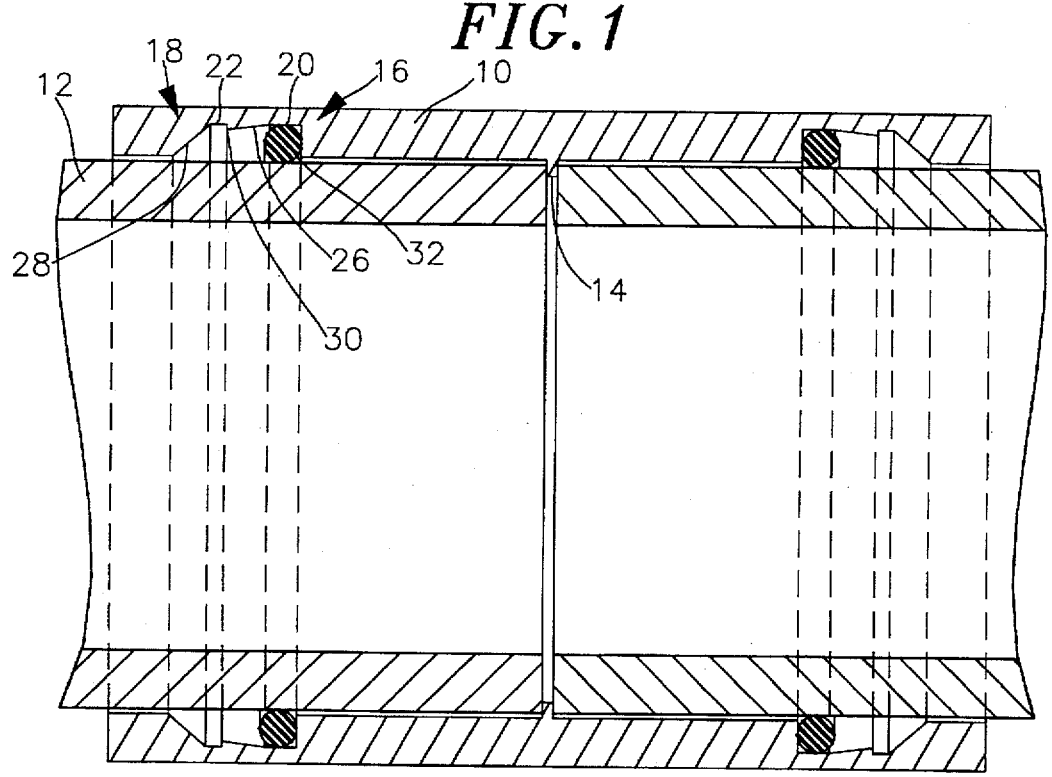
FIG. 1 is a cross-sectional view of the coupling assembly with the O-ring in its original position in the inner groove and the pipe in its fully inserted position.

As shown in FIG. 1, the pipe coupling 10 has an inner diameter slightly larger than the outer diameter of the pipe section 12 to be joined. An annular stop 14 is located mid-length on the interior of the coupling. The coupling includes a pair of abutting grooves, designated inner 16 and outer 18, on either side near the coupling ends. In cross section each groove has a substantially flat section 20, 22 (i.e. cylindrical section) further from the nearest coupling end and having a diameter greater than the diameter of the coupling end. The flat portion of each groove may have a slightly curved surface to better accommodate an O-ring gasket.

The diameter of each groove tapers as it approaches the coupling end. This constant taper forms a ramp 26, 28 in the cross sectional profile surface of each groove. In other words, the inside of the groove has a conical surface. The angle of the taper of the outer groove is in the range of 15° to 40° from the axis of the pipe with an angle of about 20° found to be the most effective. However, this angle may change depending on the coefficient of friction between the pipe and the gasket and the practical allowable distance the pipe can move relative to the coupling. At the junction between the grooves, the diameter of the inner groove is smaller than the diameter of the outer groove. This forms a circumferential ridge 30 at the junction between the grooves.

To assemble the joint, the O-ring gasket 32 is set in the flat portion of the inner groove. The outer diameter of the O-ring gasket is slightly larger than the diameter of the inner groove, which causes slight compression of the gasket. This compression tends to hold the gasket in place until the pipe is inserted. The inner diameter of the O-ring gasket is slightly smaller than the outer diameter of the pipe being used. The pipe section is inserted and slid past the O-ring, slightly compressing it. The pipe is further inserted into the coupling until it reaches the stop. The pipe is then retracted, causing the O-ring to roll along the ramp 28 formed by the tapering diameter of the inner groove.

It is recommended to slightly texture the outside of the pipe prior to insertion into the coupling to improve rolling of the O-ring. It is further recommended to avoid lubricants in the assembly of the joint.

Figure 2:
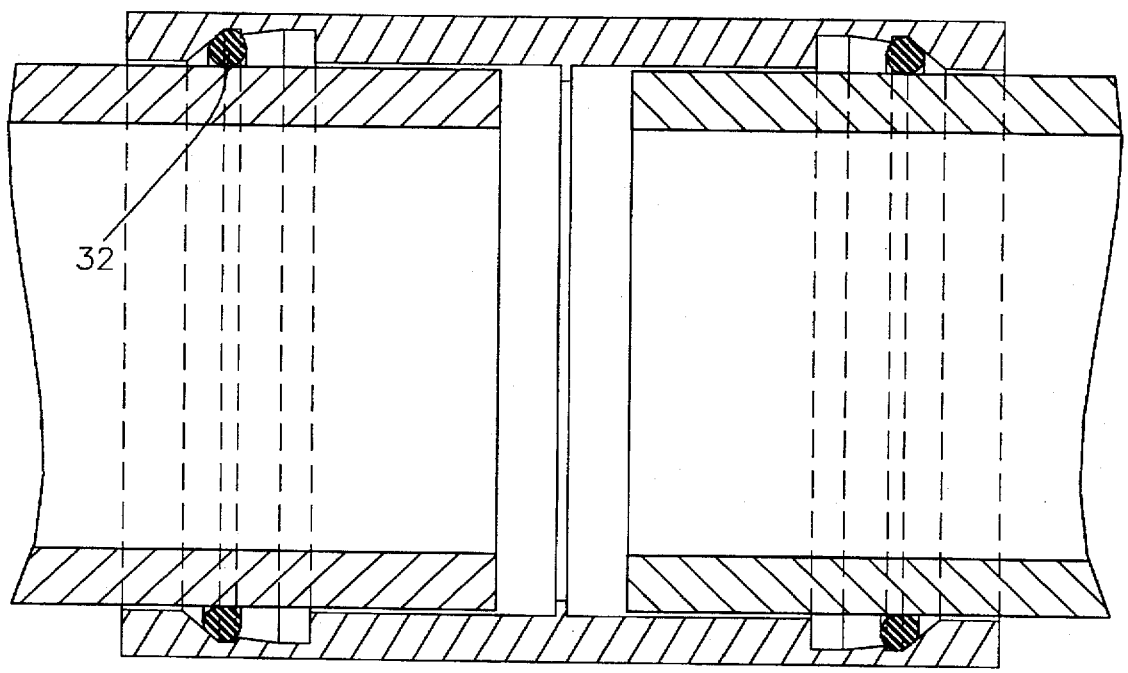
FIG. 2 is a cross-sectional view of the coupling assembly with a fully installed seal.

At the point the O-ring passes the circumferential ridge, it "sets" into the outer groove, expanding to the diameter of the flat portion 22 of the outer groove, which has an inside diameter slightly smaller than the inside diameter of the flat portion of the inner groove. In this position, the O-ring is under compression slightly higher than when the pipe was initially inserted, forming a seal between the pipe and the coupling. Such a fully assembled joint is shown in FIG. 2.

When the O-ring sets, there is a feeling of the inner gasket "popping" into place. This provides good feedback to the installer that the assembly has been correctly accomplished. Also, the ridge prevents the seal from being inadvertently dislodged due to inward motion of the pipe which the joint may experience during the installation of other sections of the pipe assembly. This method can be repeated to join a pipe on the other side of the coupling.

The short flat or cylindrical section 22 between the ridge and the beginning of the conical ramp 28 in the outer groove is found to be important in a practical joint. Initially, joints were made without such a short distance between the ridge and ramp. It was found that an O-ring may not reliably roll uniformly on the ramp in the inner groove. Thus, one circumferential part of the O-ring may pass over the ridge before another part. If the part that has passed the ridge becomes unduly compressed by the outer ramp before the rest of the O-ring has passed the ridge, the O-ring may not seat properly in the outer groove.

It is found that a distance of about one half of the cross sectional diameter of the O-ring is sufficient for the length of the flat portion in the outer groove. The distance between the ridge and the beginning of the outer ramp may be more than one half of the diameter of the O-ring, but the minimum distance is preferred for shortest overall joint length.

The assembly force required for this joint is low because the initial compression of the O-ring gasket is relatively slight. In contrast, to achieve a seal of this type in a single-groove push-type pipe joint would require a much higher assembly force.

Upon pressurization within the pipe, the load forces tend to push the pipe out of the coupling, pressing the O-ring gasket into the ramp of the outer groove. This further compresses the O-ring which tightens the seal. Friction against the pipe increases as the O-ring is wedged tighter by the ramp 28 of the outer groove. Testing of the joint in a nominal three inch pipe with full end load has shown the joint assembly to operate at pressures up to 1700 psi.

To disassemble the pipe joint, the pipe is pushed into the coupling until the O-ring rolls back into the inner groove. The pipe is then twisted and pulled out at the same time. More twisting should be done than pulling. The twisting overcomes the frictional contact between the O-ring and the pipe, while the pulling allows the pipe to move axially past the O-ring. This motion will cause the pipe to move relative to the O-ring and exit freely from the coupling after the end of the pipe passes the ring. Alternatively, the coupling may be twisted as the pipe is retracted.

Although this type of pipe joint has been shown to withstand high pressures, it is also suitable for low-cost, low pressure services, i.e., less than 200 psi. The advantages of this invention include the low assembly force required to assemble the joint, installation without special tools, and the ease of disassembly and re-assembly of the joint.

Having now described the invention as required by the patent statutes, those skilled in the art will recognize modifications and substitutions to the elements of the embodiments disclosed herein. For example, although described in the context of a pipe coupling for joining two pipes, it will be apparent that the joint may be used for joining two pipes in a bell and spigot type joint or for joining a pipe to a tee or other pipe fitting. Such modifications and substitutions are within the scope of the present invention as defined in the following claims.

What is claimed is:

1. A push-pull pipe joint comprising:
    an outer coupling member having first and second open ends and a longitudinal axis and comprising:
        a pair of tapered internal annular grooves corresponding to each open end and located near each open end, each pair comprising an inner groove further from the inner groove's corresponding open end and an abutting outer groove closer to the outer groove's corresponding open end,
        a junction located between each groove in said pair,
        wherein each inner groove has a tapering portion which tapers at a constant angle toward an abutting outer groove, forming a conical section,
    wherein the diameter of each outer groove immediately adjacent said junction is larger than the diameter of the abutting inner groove immediately adjacent said junction, forming a circumferential ridge between the grooves, and
    wherein each outer groove has a tapering portion which tapers at a constant angle toward the outer groove's corresponding open end, decreasing the groove diameter to a diameter equal to the inside diameter of the open end;
    first and second internal pipes, each to be joined to a corresponding end of the outer coupling member, wherein the outside diameter of each pipe is smaller than the inside diameter of the outer coupling corresponding open end, whereby each pipe fits into the pipe's corresponding open end of the coupling member; and
    first and second O-ring gaskets, the first gasket compressed between an inner surface of the coupling and an outer surface of the first pipe, and the second gasket compressed between an inner surface of the coupling and an outer surface of the second pipe,
    wherein the first pipe rolls the first O-ring gasket along the inner groove of the coupling first end, past the circumferential ridge and into the abutting outer groove, wherein the first O-ring gasket is further rolled and is trapped by the tapering portion of the outer groove, thereby forming a joint between the first pipe and the coupling first end, and
    wherein the second pipe rolls the second O-ring gasket along the inner groove of the coupling second end, past the circumferential ridge and into the abutting outer groove, wherein the second O-ring gasket is further rolled and is trapped by the tapering portion of the outer groove, thereby forming a joint between the second pipe and the coupling second end.

2. A push-pull pipe joint as recited in claim 1 wherein each inner groove further comprises a flat portion parallel to the coupling longitudinal axis forming the deepest section of the groove.

3. A push-pull pipe joint as recited in claim 2 wherein each outer groove further comprises a flat portion parallel to the coupling longitudinal axis.

4. A push-pull pipe joint as recited in claim 3 wherein each outer groove has a steeper taper than the inner groove.

5. A push-pull pipe joint as recited in claim 4 wherein the angle of the taper of each outer groove is between 15° and 40°.

6. A push-pull pipe joint as recited in claim 1 wherein each outer groove further comprises a flat portion parallel to the coupling longitudinal axis.

7. A push-pull pipe joint as recited in claim 6 wherein each flat portion has a longitudinal length at least one half of the cross sectional diameter of the corresponding O-ring.

8. A push-pull pipe joint as recited in claim 7 wherein the angle of the taper of each outer groove is about 20°.

9. A push-pull pipe joint as recited in claim 1 wherein each O-ring gasket has an outside diameter slightly larger than the largest diameter of the corresponding inner groove.

10. A push-pull pipe joint as recited in claim 1 wherein each inner groove has a diameter at least equal to the largest diameter of the corresponding outer groove.

11. A push-pull pipe joint as recited in claim 1 wherein the outside surface of each pipe is textured to facilitate rolling of the O-ring gaskets upon axial movement of the pipes.

12. A push-pull pipe joint as recited in claim 1 further comprising an annular stop member on an inner surface of the outer coupling proximate the coupling member midsection for stopping the travel of a pipe.

13. A push-pull pipe joint comprising:
an outer pipe coupling member having an open end and comprising:
a pair of tapered internal grooves near the open end of the coupling member wherein said pair comprises an inner groove further from the open end abutting an outer groove closer to the open end,
a junction located between the grooves,
wherein the diameter of the outer groove immediately adjacent said junction is larger than the diameter of the inner groove immediately adjacent said junction, forming a circumferential ridge between the grooves, and
wherein the outer groove comprises a portion tapering toward a smaller diameter nearer the open end and a flat portion between the tapered portion and the ridge;
an internal pipe to be joined, wherein the outside diameter of the pipe smaller than the inside diameter of the coupling member open end; and
an O-ring gasket compressed between an inner surface of the coupling and an outer surface of the pipe,
wherein the pipe rolls the compressed O-ring gasket along the inner groove and into the abutting outer groove, wherein the O-ring gasket is further rolled and is trapped by the tapered portion of the outer groove, thereby forming a joint between the pipe and the coupling end.

14. A push-pull pipe joint as recited in claim 13 wherein the flat portion has a longitudinal length at least one half of the cross sectional diameter of the O-ring.

15. A push-pull pipe joint as recited in claim 13 wherein the tapered portion of the outer groove is conical and the angle of the taper is between 15° and 40°.

16. A push-pull pipe joint as recited in claim 15 wherein the angle of the taper of the outer groove is about 20°.

17. A push-pull pipe joint as recited in claim 16 wherein the O-ring gasket has an outside diameter slightly larger than the diameter of the flat portion of the outer groove.

18. A push-pull pipe joint as recited in claim 16 wherein the inner groove has a diameter is at least equal to the largest diameter of the corresponding outer groove.

19. A push-pull pipe joint as recited in claim 16, wherein the outside surface of each pipe is textured to facilitate rolling of the O-ring gaskets upon axial movement of the pipes.

20. A push-pull pipe joint as recited in claim 16 wherein the circumferential ridge between the inner and outer joints restricts outward movement of the O-ring gasket.

21. A push-pull pipe joint as recited in claim 13 further comprising an annular stop member on an inner surface of the outer coupling proximate the coupling member midsection for stopping the travel of a pipe.

22. A method for joining a pipe and a coupling member having an open end and an outer tapered groove near the open end abutting an inner tapered groove, with a junction formed by a circumferential ridge located between said grooves wherein each groove has a flat section and a tapered section which tapers toward the open end, comprising the steps of:

fitting an O-ring gasket into the flat section of the inner groove;

sliding the pipe inside the end of the coupling member and engaging an inside annular surface of the O-ring gasket, compressing the O-ring gasket against an inner surface of the coupling;

retracting the pipe from the coupling member to roll the O-ring gasket against the decreasing diameter taper of the inner groove; and further retracting the pipe until the entire O-ring gasket rolls past said circumferential ridge at the junction between the grooves and expands into the flat portion of the outer groove, wherein the O-ring gasket is restrained by the tapered portion of the outer groove.

23. A method for disassembling pipes joined as recited in claim 22 comprising the steps of:

pushing the pipe into the coupling member for rolling the O-ring into the inner groove; and rotating the pipe relative to the coupling member while gradually extracting the pipe from the coupling member, wherein the rotating motion overcomes friction between the O-ring and the pipe to allow for the extraction of the pipe.

24. A push-pull pipe joint comprising:
an outer coupling member having an open end and comprising:
a pair of tapered internal annular grooves near the open end comprising an inner groove further from the open end abutting an outer groove closer to the open end,
wherein each inner groove has a tapering portion which tapers at a constant angle toward the adjacent outer groove, forming a conical section, and
wherein each outer groove has a tapering portion which tapers at a constant angle toward the open end, decreasing the groove diameter to a diameter equal to the inside diameter of the open end the; diameter of said outer groove is greater than the diameter of said inner groove where said grooves are abutting an internal pipe to be joined to the outer coupling member, wherein the outside diameter of the pipe is slightly smaller than the inside diameter of the open end; and an O-ring gasket compressed between an inner surface of the coupling and an outer surface of the pipe, wherein the pipe rolls the compressed O-ring gasket along the inner groove tapering portion and into the abutting outer groove, wherein the O-ring gasket is further rolled and is trapped by the tapered portion of the outer groove, thereby forming a joint between the first pipe and the coupling end.

25. A push-pull pipe joint as recited in claim 24 wherein said pair of inner and outer grooves has a circumferential ridge formed at the junction between an inner and outer grooves wherein the diameter of the outer groove proximate the junction is greater than the diameter of the inner groove proximate the junction.

* * * * *